United States Patent
Kelman et al.

[11] Patent Number: 5,679,296
[45] Date of Patent: Oct. 21, 1997

[54] CUSHIONED AUTOMOTIVE INTERIOR TRIM PART AND PROCESS OR MAKING SAME

[75] Inventors: Josh Kelman; Stephen N. Roberts, both of Dover, N.H.; William W. Knight, Livonia; Randy Reed, Algonac, both of Mich.; David R. Pinson, East Rochester, N.H.; Alfred F. Brault, South Berwick, Me.

[73] Assignee: Davidson Textron, Inc., Dover, N.H.

[21] Appl. No.: 536,063

[22] Filed: Sep. 29, 1995

[51] Int. Cl.$^6$ ............................................. B29C 51/10
[52] U.S. Cl. ........................ 264/71; 264/511; 264/517; 264/121; 264/37
[58] Field of Search ........................ 264/37, 510, 511, 264/257, 517, 121, 69, 71; 156/62.2, 73.6, 87, 245, 285

[56] References Cited

U.S. PATENT DOCUMENTS

| | | |
|---|---|---|
| 3,268,636 | 8/1966 | Angell, Jr. . |
| 4,053,545 | 10/1977 | Fay . |
| 4,131,667 | 12/1978 | Lovell et al. . |
| 4,476,183 | 10/1984 | Holtrop et al. . |
| 4,591,469 | 5/1986 | Buchanan et al. . |
| 4,609,519 | 9/1986 | Pichard et al. ........................ 264/517 |
| 4,794,038 | 12/1988 | Marcus ........................ 264/517 |
| 5,034,178 | 7/1991 | Kinugasa et al. . |
| 5,073,318 | 12/1991 | Rohrlach et al. . |
| 5,194,194 | 3/1993 | Kato et al. . |
| 5,225,130 | 7/1993 | Deiringer . |
| 5,298,321 | 3/1994 | Isoda et al. ........................ 428/288 |
| 5,536,341 | 7/1996 | Kelman ........................ 156/62.2 |
| 5,571,465 | 11/1996 | Gill et al. ........................ 264/121 |

FOREIGN PATENT DOCUMENTS

| 6-192952 | 7/1994 | Japan ........................ 264/517 |
|---|---|---|

*Primary Examiner*—Catherine Timm
*Attorney, Agent, or Firm*—Reising, Ethington, Barnard & Perry

[57] ABSTRACT

An automotive interior trim part (10) is made by molding a substrate retainer layer (16), forming a skin layer (12) and forming an intermediate layer (14). The intermediate layer (14) is formed from a plurality of clusters of entangled high melt and low melt kinked fibers of polyethylene terephthalate (PET). The PET layer is blown into a partially closed mold that has the skin and retainer positioned in each mold die. The mold undergoes induced vibrations to promote tightening of the packed clusters. The mold is then fully closed to compress the PET fibers into full density. Heated air is then blown into the mold to soften the low melt fibers to adhere them to the retainer layer and skin. Cool air is then blown into the mold to resolidfy the clusters and form the intermediate layer into its molded shape.

7 Claims, 2 Drawing Sheets

CUSHIONED AUTOMOTIVE INTERIOR TRIM PART AND PROCESS OR MAKING SAME

TECHNICAL FIELD

The field of this invention relates to automotive interior trim panels and the molding process therefor.

BACKGROUND OF THE DISCLOSURE

Automotive interior trim panels typically comprise a multi-layered construction. The layered construction may include an inner retainer or supportive substrate, an intermediate cushion layer, and an outer skin or covering. The retainer is usually injection molded from a structural plastic material such a polypropylene or other engineering resin. When appropriate, fiberglass may reinforce the plastic material. The skin is customarily vacuum formed from a sheet of polyvinyl chloride polymer (PVC) or acrylonitrile butadiene styrene polyvinyl chloride (ABS/PVC) and may have a decorative textured surface or coloring. The retainer and skin are placed in a foaming mold and a semi-rigid urethane foam cushion is poured in place to fill the space between the vacuum formed or cast skin and the injection molded retainer. The semi-rigid foam cushion is typically an elastomeric thermoset polyurethane.

Automotive vehicles are manufactured in great quantities each year, and thus great efforts have been made to make these vehicles from environmentally friendly materials. Also, great efforts have been made to simplify recycling processes such that these environmentally friendly materials are expeditiously recycled to be used repeatedly over again.

Automotive interiors trim panels are included in these efforts to provide for environmentally friendly and recyclable materials. However, the known retainer, cushion, and skin must be separated for reuse or recycling because each component is made of a different polymer. This separation process is a tedious and expensive operation that is a disincentive for recycling of such automotive interior trim panels.

While the retainer and skin are known to have been made from the same material or same family of materials, the intermediate layer has generally been formed from a foam cushion. The foam cushion is often based with urethane which poses environmental and recycling difficulties.

What is needed is shaped or contoured and soft touch automotive trim panel having an intermediate cushion layer of virtually any configuration made from a polymer plastic material. What is also needed is a soft touch automotive trim panel that can be recycled without having to separate the laminated construction into separate components by incorporating plastic fibers in the intermediate layer of compatible plastic composition as the covering and substrate.

SUMMARY OF THE DISCLOSURE

In accordance with one aspect of the invention, an automotive interior trim panel includes a covering layer having an under interface surface, a backing layer of plastic material forming an supportive back layer or retainer with an interface surface, and an intermediate layer of kinked polymeric fiber formed from clusters of entangled fibers. The clusters are bound together into the intermediate layer with the intermediate layer of fiber having a first interface surface that is adhered to the cosmetic skin covering interface surface and a second interface surface adhered to the interface surface of the second layer. The covering layer, the backing layer and the intermediate layer are preferably all made from a plastic polymer that is derived from the same monomer. Preferably, the polymer is polyethylene terephthalate.

The covering layer, backing layer and the intermediate layer are bound together by the fibers in the intermediate layer. Preferably the fibers are a blend of high melt and low melt polyethylene terephthalate.

In accordance with another aspect of the invention, an automotive interior trim panel includes an intermediate cushion layer made from polyethylene terephthalate. Preferably, the intermediate cushion layer is a blend of high melt and low melt fibers.

In accordance with another aspect of the invention, a method of manufacturing a shaped automotive interior trim panel having an inner supportive substrate, an outer skin layer and an intermediate cushioning layer includes the steps of molding an inner substrate of relatively rigid polymeric material, molding an outer skin of flexible polymeric material, forming an intermediate layer of polymeric fibers that are kinked and clustered to provide a compressible and resilient cushioning effect, and laminating the inner substrate and outer skin to the intermediate layer to provide a shaped composite automotive interior panel. Preferably, all the layers are made of compatible and recyclable polymer construction such that the part does not have to be separated into components for recycling.

According to another aspect of the invention, a method of manufacturing a shaped automotive interior trim panel having an inner supportive substrate, an outer skin layer and an intermediate cushioning layer includes molding an inner substrate of relatively rigid plastic material. The inner substrate has a plurality of openings. An outer skin of flexible plastic material is also formed. The inner substrate and outer skin are positioned in a closable mold having first and second mold dies. The mold is partially closed such that a gap exists between said first and second mold dies at a parting line to form a vent. A plurality of clusters of kinked polymeric fibers, preferably a blend of high melt and low melt fibers of PET are blown through tubes connected to one of said mold dies and through the openings in the inner substrate to form an intermediate layer between the substrate and skin. The intermediate layer has a compressible and resilient cushioning effect.

The mold is vibrated during the blowing in of the PET clusters which promotes even distribution of the clusters and packs them tighter together. The mold is further closed to achieve full part density of the intermediate layer. Heated air is then blown through said tubes and at a positive pressure to soften said clusters and conform its shape and the shape of the skin to the shape of the mold. The mold is preferably vented through a tube that draws a vacuum from the interior of the mold. Cool air is then blown through the tubes to resolidify the softened clusters and set the clusters in the molded shape to provide a shaped composite automotive interior panel.

BRIEF DESCRIPTION OF THE DRAWINGS

Reference now is made to the accompanying drawings in which.

DETAILED DESCRIPTION OF THE PREFERRED EMBODIMENT

Figure 1:
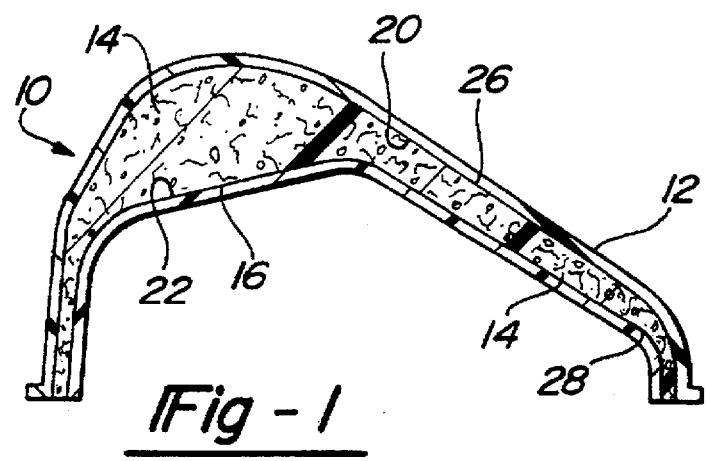
FIG. 1 is a sectional view of an automotive instrument panel made in accordance with the invention.

Referring now to FIG. 1, an interior automotive trim panel such as instrument panel 10 is a composite of three components. The panel 10 has a skin or facing layer 12 of a flexible thermoplastic. The panel 10 also has an intermediate layer 14 made from polyethylene terephthalate (PET) effecting a soft resilient feel. A structurally semi-rigid substrate or retainer 16 of plastic underlies the other two layers.

The three components are made of chemically similar materials so that the instrument panel 10 can be recycled easily without any need for separating any of the three components beforehand. All three layers may be formed from PET. One way of forming the panel 10 is by forming the three components separately and then laminating them together. The substrate 16 may be injection molded or blow molded, compression molded or stamped. The substrate may be reinforced with fiber glass, wood fiber or ground up thermal plastic parts in a well known fashion.

The intermediate layer 14 may be formed by directed fiber spraying the clusters of PET. The clusters may be up to an 1" in diameter with the fibers kinked. Typically these are 20 to 30 fibers entangled together in each cluster of 1" diameter. The clusters are composed of a blend of high melt and low melt fibers. The blend is approximately 90% high melt fibers and 10% low melt fibers. The PET clusters are commercially available from DuPont under a commercial MSDS designation of Dacron Polyester Fiber. The clusters can be heated to above the melting temperature of the low melt fibers such that the low melt fibers melt together and binds the high melt fibers together. The melting temperature of the fibers is known to be 200° F. so heat in the range of 200°–350° F. is acceptable. The clusters are then cooled such that they are bound together in the desired preform shape.

The three parts 12, 14 and 16 are then laminated together with adhesive being sprayed on the interfacing surfaces 20 and 22 of the skin 12 and substrate 16 to be adhered to corresponding surfaces 26 and 28 of the intermediate layer 14. The components are then pressed together in a suitable press.

Another method is to form a substrate 16 as mentioned above and form vacuum access holes therethrough. An intermediate batting layer of PET fiber with 90% high melt and 10% low melt fibers may be placed on the substrate and the skin or facing layer 12 of flexible thermoplastic olefin (TPO). The PET intermediate layer 14 and skin layer 12 are then appropriately heated and then vacuum formed over the substrate 16 in a well known fashion.

Figure 2:
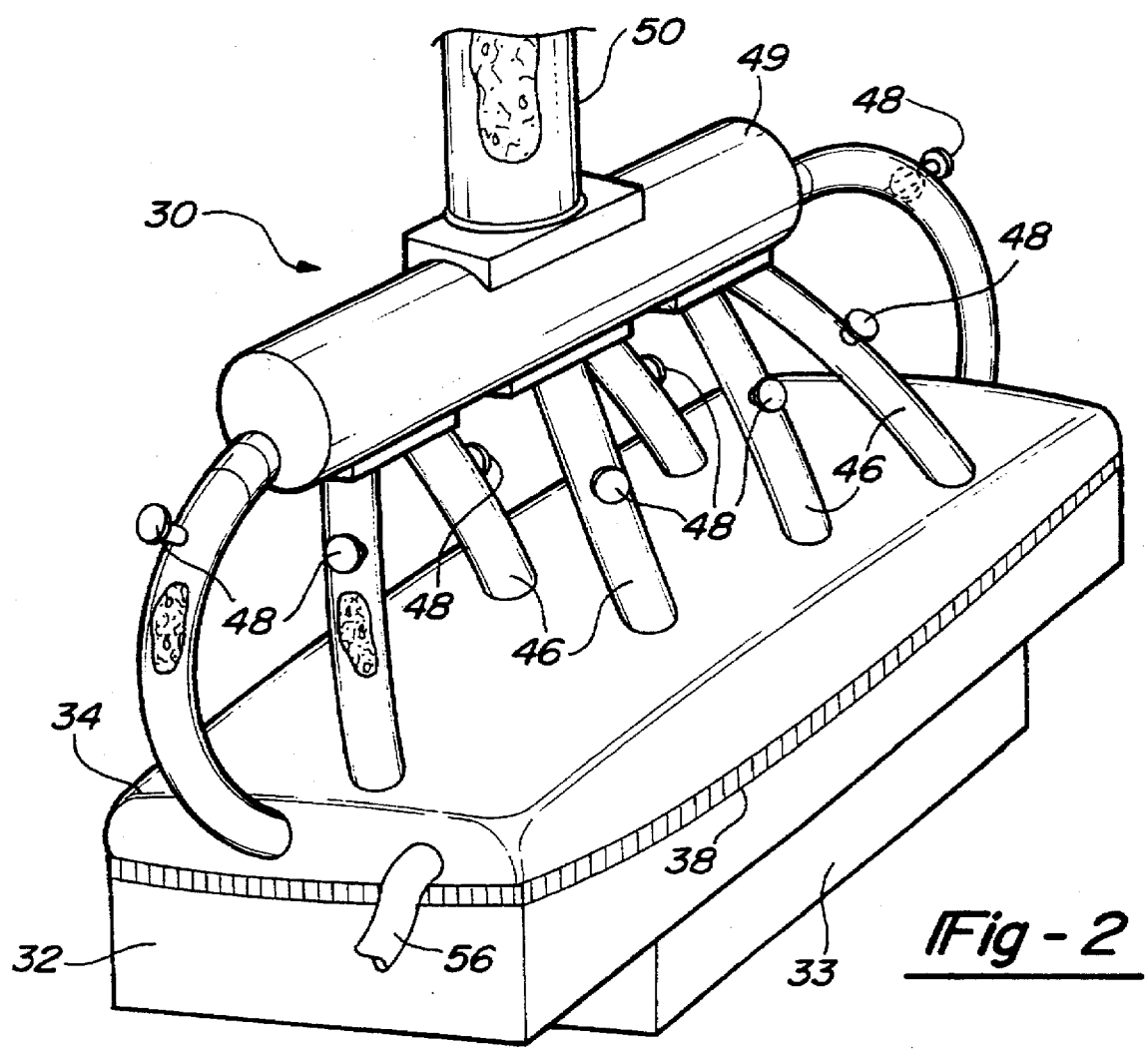
FIG. 2 is a top perspective view of a mold and piping used to make the instrument panel shown in FIG. 1.
Figure 3:
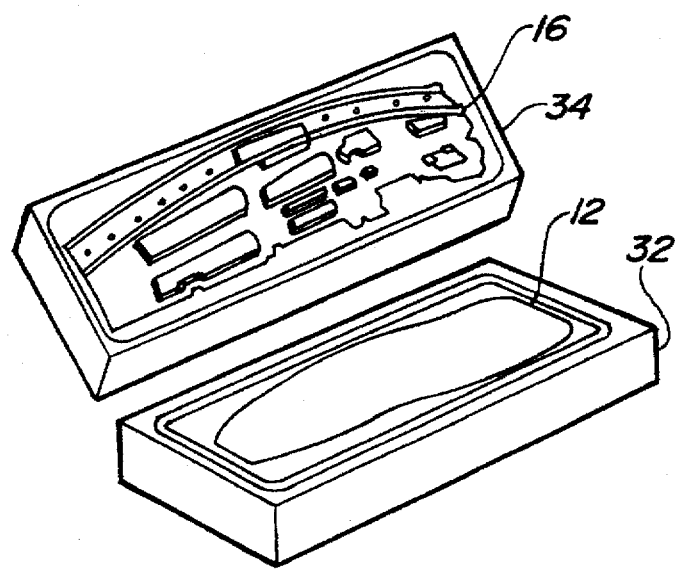
FIG. 3 is a perspective view of the mold shown in FIG. 2 in an open position.
Figure 4:
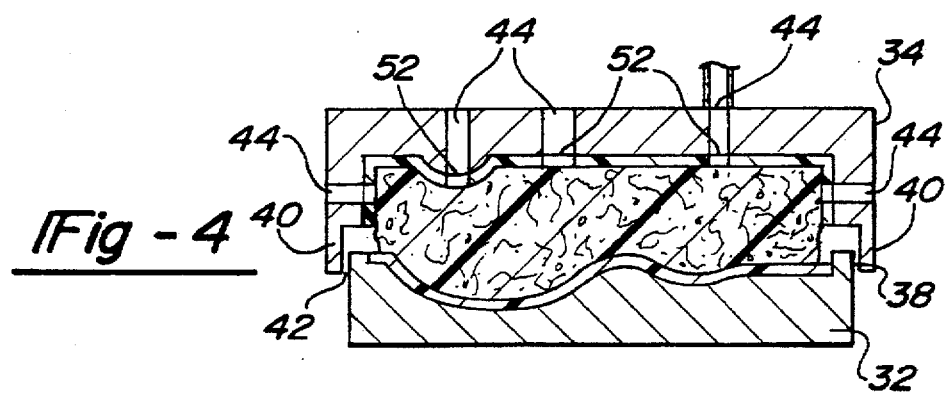
FIG. 4 is a cross sectional view of the mold shown in FIG. 2 showing the mold in a partially closed position.

It is also possible for the intermediate layer 14 to be formed between the skin 12 and substrate 16. Such a method is further described with reference to FIGS. 2–5. As shown in FIGS. 2 and 3, a mold device 30 has mold dies 32 and 34. The molds 32 and 34 may interconnect together via an expandable gasket at the part line 38 or the molds may be a shear edge type with a lip 40 of one 34 overlapping the other 32. Vents 42 are formed at the part line 38 when the mold is in a partially closed position as shown in FIGS. 2 and 4.

Mold die 32 is secured onto a pneumatic vibrator 33. The vibrator vibrates the mold die 33 in both horizontal directions at approximately 60 $H_z$. The amplitude of the vibrations may range from 1/10" to over 1/2" depending on the particular mold size and cavity configuration.

The mold die 34 has a plurality of passages 44 connected to tubes 46. Each tube 46 has a control valve 48 for controlling the amount of PET clusters that may pass therethrough. The tubes 46 are connected to a distribution manifold 49 that is connected to a supply line 50 for delivery of the PET clusters with an air flow under pressure. The tubes 46 may be made of a flexible material to accommodate the vibrations of the mold parts 32 and 34 induced by vibrator 33.

The skin 12 and the substrate 16 are formed as described above and then placed in the respective mold dies 32 and 34. The substrate 16 has openings 52 therein that are aligned with the passages 44. The mold dies are partially closed. A gap of 2–15 mm are foreseen for many applications such that the vents 48 are open. The PET clusters are then blown in through the tubes 46 from the supply line 50 and manifold 49. The amount through each tube 46 is controlled by the adjustment of the valves 48. The tubes and passages are appropriately positioned in the mold to provide complete delivery of the PET clusters within the mold interior between the skin 12 and substrate 16 which oppose each other as illustrated in FIG. 4. During the blowing in of the clusters, the vibrator 33 vibrates the mold die 32 which tightens the packing of the clusters.

Figure 5:
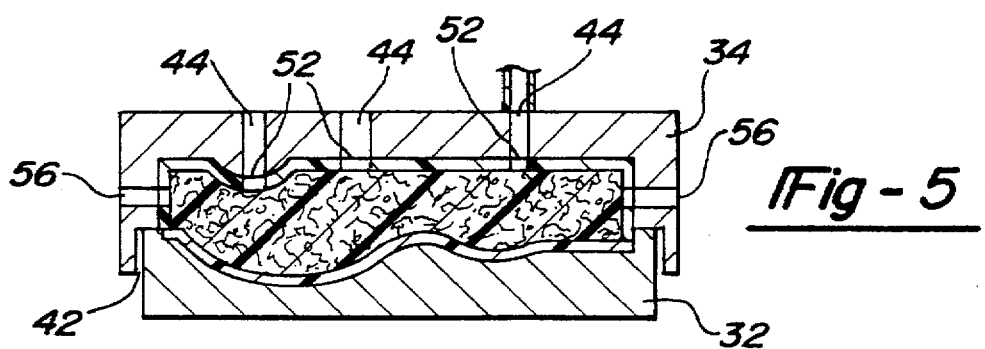
FIG. 5 is a view similar to FIG. 4 with the mold moved to a completely closed position.

After the PET clusters fill the interior section between the skin and substrate, the mold is then fully closed to further compress the PET layer to achieve full part density as shown in FIG. 5. One or more vents 48 remain open when the mold is fully closed as illustrated in FIG. 5. The supply line 50, manifold 49, and tubes 46 are used to meter in hot air that is between 200°–350° F. One or more passages 56 may to connected to a vacuum to allow the heated air to heat all parts of the fiber cluster layer 14. The low melt fibers soften and become bound with the high melt fibers, the substrate layer 16, and skin 12. The heat also stretches the skin 12 to assure that it obtains the proper shape conforming to the mold die 32. Cooling air is then passed through the tubes 46 to solidify the clusters and set them in the molded shaped. The mold is then opened and the completed part 10 is then removed.

The PET clusters may be rammed into the mold interior with differing pressures in different tubes 48 to obtain the necessary density throughout the layer 14. The pressure can be increased in vertical sections of the mold such as the ends where part geometries are not expanded or compressed by the opening and closing of the mold dies.

In this fashion, an expeditious manufacturing process for producing a soft interior automotive parts such as instrument panel, door panels and consoles is reduces the cost of switching a factory over to using PET fibers in automotive components. Furthermore, a soft interior automotive component replaces conventional foam material with PET fibers in cluster form with kinks in the entangled fibers providing the resilient cushioning feel. The PET fibers can be used with identical or similar material in the outer and substrate layers to simplify recycling, both as part trim and scrap. If the substrate and skin are also made from PET, the entire component may be recycled without separation. If the skin layer 12 is a vinyl, the vinyl can be recycled conventionally.

Variations and modifications are possible without departing from the scope and spirit of the present invention as defined by the appended claims.

The embodiments in which an exclusive property or privilege is claimed are defined as follows:

1. A method of manufacturing a shaped composite automotive interior trim panel having an inner supportive substrate, an outer skin layer and an intermediate cushioning layer characterized by the steps of:

molding an inner substrate of relatively rigid material, said inner substrate having a plurality of openings;

molding an outer skin of flexible material;

placing the inner substrate and outer skin in a closable mold having first and second mold dies, said mold being partially closed such that a gap exists between said first and second mold dies at a parting line;

blowing in clusters of kinked polymeric fibers through tubes connected to one of said mold dies and through said openings in said inner substrate to form an intermediate layer having a compressible and resilient cushioning effect with venting occurring through said parting line;

further closing said mold to achieve full part density;

blowing heated air through said tubes and at a positive pressure to soften said clusters and conform the shape of the clusters and the shape of the skin to the shape of the mold;

venting said mold through a tube that draws a vacuum from the interior of said mold blowing cooling air through said tubes to resolidify the softened clusters and set the clusters to the molded shape to provide a shaped composite automotive interior panel.

2. A method as defined in claim 1 further characterized by:

vibrating said mold after said blowing in of said clusters such that induced vibrations tighten the packing of said clusters.

3. A method as defined in claim 2 further characterized by:

said intermediate layer, said inner substrate and said skin are all made from plastic materials that are derived from the same monomer.

4. A method as defined in claim 2 further characterized by:

said inner substrate, said outer skin and said intermediate layer are all made from polyethylene terephthalate.

5. A method as defined in claim 4 further characterized by:

said clusters being made from a blend of high melt and low melt fibers of polyethylene terephthalate with the heated air being above a melting temperature of said low melt fibers and being below a melting temperature of said high melt fibers.

6. A method of manufacturing a shaped composite automotive interior trim panel having an inner supportive substrate, an outer skin layer and an intermediate cushioning layer characterized by the steps of:

molding an inner substrate of relatively rigid material, said inner substrate having a plurality of openings;

molding an outer skin of flexible material;

placing the inner substrate and outer skin in respective first and second mold dies, said mold dies being positioned to form a mold interior between the skin and substrate which oppose each other;

blowing in clusters of kinked polymeric fibers through tubes connected to one of said mold dies and through said openings in said inner substrate and into said mold interior to form an intermediate layer having a compressible and resilient cushioning effect with venting occurring through a parting line between said first and second mold dies;

blowing heated air through said tubes and at a positive pressure to soften said clusters and conform the shape of the clusters and the shape of the skin to the shape of the mold;

venting said mold through a tube that draws a vacuum from the interior of said mold; and blowing cooling air through said tubes to resolidify the softened clusters and set the clusters to the molded shape to provide a shaped composite automotive interior panel.

7. A method as defined in claim 6 further characterized by:

said clusters being made from a blend of high melt and low melt fibers of polyethylene terephthalate with the heated air being above a melting temperature of said low melt fibers and being below a melting temperature of said high melt fibers.

* * * * *